United States Patent [19]

Burba et al.

[11] 4,440,900

[45] Apr. 3, 1984

[54] METHOD FOR MAKING COATINGS AND ADHESIVE BONDS WITH POLYVINYL CHLORIDE PLASTISOLS HAVING IMPROVED ADHESION, AND PLASTISOLS FOR SAID PROCESS

[75] Inventors: Christian Burba, Ascheberg-Herbern; Ulrich Goeke, Luenen; Norbert Esper, Bergkamen, all of Fed. Rep. of Germany

[73] Assignee: Schering AG, Berlin and Bergkamen, Fed. Rep. of Germany

[21] Appl. No.: 497,163

[22] Filed: May 23, 1983

[30] Foreign Application Priority Data

Jun. 5, 1982 [DE] Fed. Rep. of Germany ....... 3221354

[51] Int. Cl.³ .................... B05D 7/24; B05D 5/10; C09D 3/74; C09J 3/14
[52] U.S. Cl. .................... 524/569; 156/333; 524/297; 524/384; 524/567; 525/180
[58] Field of Search .................... 156/333; 525/180; 524/297, 384, 567, 569

[56] References Cited

U.S. PATENT DOCUMENTS

| | | | |
|---|---|---|---|
| 3,136,681 | 6/1964 | Johnston | 156/333 |
| 4,146,520 | 3/1979 | Bierwirth et al. | 523/400 |
| 4,401,720 | 8/1983 | Davis et al. | 156/333 |

FOREIGN PATENT DOCUMENTS

| | | |
|---|---|---|
| 2123171 | 11/1974 | Fed. Rep. of Germany . |
| 2402037 | 5/1975 | Fed. Rep. of Germany . |
| 2073224 | 10/1981 | United Kingdom . |

OTHER PUBLICATIONS

Chem. Abst. 90, 206032d, (1979), German 2,840,996.

*Primary Examiner*—Ronald W. Griffin
*Attorney, Agent, or Firm*—Curtis, Morris & Safford

[57] ABSTRACT

What are disclosed are a method for the bonding of metallic materials and for producing coatings on metallic materials with a polyvinyl chloride plastisol which has improved adhesion at baking temperatures of 90° C. and up and which contains, as an adhesion-improving additive, a condensation product of a polymerized fatty acid, a polycarboxylic acid having three or more COOH groups, an optional dicarboxylic acid, and an excess based on the carboxyl groups of the acid components, of a polyalkylene polyamine, and plastisols suitable for such a process.

10 Claims, No Drawings

METHOD FOR MAKING COATINGS AND ADHESIVE BONDS WITH POLYVINYL CHLORIDE PLASTISOLS HAVING IMPROVED ADHESION, AND PLASTISOLS FOR SAID PROCESS

The present invention relates to a process for the bonding of metallic materials and for the production of coatings on metallic materials with a polyvinyl chloride plastisol having improved adhesion at baking temperatures of 90° C. and up, which plastisol contains, as an adhesion-improving additive, a condensation product of a polymerized fatty acid, a carboxylic acid, and an excess, based on the carboxyl groups of the acid components, of a polyalkylene polyamine.

Polyvinyl chloride and its copolymers having long been known to possess resistance to deterioration caused by the action of aggressive media and they are, therefore, widely used to impart corrosion resistance to metallic surfaces, to bond thin sheet metal structures, and to seal welds, especially in the automotive field.

Such coatings are applied to the surface of the materials to be protected mainly in the form of plasticized vinyl chloride polymers (plastisols) by spread coating, roller coating, or spray coating. In one widely used form, such coating materials (plastisols) are formed of a plasticizer or mixture of plasticizers, of a polyvinyl chloride adapted to being made into a paste and distinguished in particular by a definite swelling capacity in the plasticizer, and of fillers, stabilizers and, optionally, pigments and PVC processing aids.

The formulation of plasticized polyvinyl chloride coating materials, their preparation, and the methods of applying them are described in great detail in Krekeler Wick, Kunststoff-Handbuch ("Plastics Handbook"), 1963, vol. II, part 1, pp. 396 et. seq.

The adhesion to the material of a plastisol so used is known to be an important criterion for its quality. This is true particularly of coatings on metal parts. Loose adhesion of the protective film increases the likelihood of penetration by aggressive media. Water, for example, can readily seep in between the coating and the metal and corrode the latter. The poorer the adhesion of the protective film to the metal, the greater the likelihood that this will occur.

Thus there has been a need for plastisols which make it possible to produce high-strength bonds between a wide variety of materials, and especially metallic materials.

To increase the adhesion of such coatings, it has already been proposed in published German patent application DOS 21 23 171 to work a mixture of a polyfunctional organic acid or its anhydride and of a polyfunctional organic base into the plastisol. The constituents of this mixture are said to react with each other with salt formation even at cure temperatures of less than 140° C. and to impart good adhesion to the plastisol.

However, as has been shown in published German patent application DAS 24 02 037, column 2, lines 25 to 27, and in Example 4 (d), following the directions given in DOS 21 23 171 does not lead to satisfactory results.

According to published German patent application DAS 26 54 871, polyaminoamides having a certain imidazoline content and made from a polymerized mixture of fatty acids with a high content of trimeric and higher polymeric fatty acids and an excess of polyalkylene polyamines, are used as adhesion promoters in an amount from 0.5 to 5 weight percent, based on the plastisol mass.

These polyaminoamides permit a definite improvement in adhesive strength to be obtained. When used in low concentrations, however, and at low baking temperatures, they leave room for further improvement with respect to the adhesion, thermal stability, and elongation at rupture of the cured PVC plastisol.

The object of the invention thus has been to develop adhesion promoters for polyvinyl chloride plastisols which impart high adhesion to protective coatings and high bond strength to adhesive bonds, together with improved thermal stability and elongation at rupture, even when used in low concentration and at a low baking temperature.

In accordance with the invention, this object is accomplished by a process for making coatings and adhesive bonds for materials using a plastisol comprising finely divided polyvinyl chloride or vinyl chloride copolymers which contain the usual fillers, additives, solvents, and plasticizers, but wherein there is added to the plastisol, as an adhesion promoter, from 0.5 to 5 weight percent, based on the plastisol mass, of a condensation product prepared from (A) polymerized fatty acids,
(B) a polycarboxylic acid having three or more COOH groups, or an anhydride or ester thereof, in amounts ranging from 3 to 20 weight percent, based on the mixture of fatty acids,
(C) optionally, an aliphatic, araliphatic, or aromatic dicarboxylic acid or an aromatic monocarboxylic acid, and
(D) an excess, based on the carboxyl groups of the components (A), (B) and (C) (if present), of a polyalkylene polyamine. The plastisol so prepared is baked onto a substrate material at temperatures of 90° C. and up.

A further object of the present invention is characterized in that the polymerized fatty acids according to (A) contain a high proportion (X) of trimerized and higher-polymerized fatty acids.

Still another feature of the present invention is that in a first step the components (A) and (D) are polycondensed and in a second step the aminoamide so formed is reacted with the component (B) and with optional component (C).

To prepare the polyaminoamides employed in accordance with the invention as adhesion promoters, polymerized fatty acids with varying contents of monomeric, dimeric, trimeric and higher polymeric amines may be used.

The term "polymerized fatty acid" refers, in a general way, to polymerized acids obtained from fatty acids. Fatty acids are unsaturated natural and synthetic monobasic aliphatic acids having from 8 to 22 carbon atoms, and preferably 18 carbon atoms. Fatty acids can be polymerized by known processes.

Polymeric fatty acids suited for use in accordance with the invention are commercial products having approximately the following composition:

| Monomeric acids | 5 to 15 weight percent |
|---|---|
| Dimeric acids | 55 to 80 weight percent |
| Trimeric and higher-polymerized acids | 10 to 35 weight percent |

However, in accordance with the invention, polymerized fatty acids having high contents (X) of trimers and higher polymers are preferred. These acids may be prepared by selective reaction based on a free-radical mechanism according to published German patent application DOS 25 06 211, or by generally known distillation methods from typical commercially available products, and have approximately the following composition:

| Monomeric acids | 0 to 5 weight percent |
|---|---|
| Dimeric acids | 10 to 25 weight percent |
| Trimeric and higher-polymerized acids (X) | 90 to 75 weight percent |

The carboxylic acids (or their anhydrides) or the carboxylic acid esters which may be used concurrently in accordance with the invention have the general formula $$R^1-(COOR^2)_n$$

wherein $R^1$ is optionally substituted saturated or unsaturated aliphatic, araliphatic, or aromatic hydrocarbon having from 4 to 12 carbon atoms, $R^2$ is hydrogen or alkyl having from 1 to 8 carbon atoms, and n is 3 or higher.

Examples of such acids are trimellitic anhydride and butanetetracarboxylic acid.

Examples of the optionally present carboxylic acid according to (C) which may be used are succinic acid, glutaric acid, adipic acid, pimelic acid, suberic acid, azelaic acid, sebacic acid, decanedicarboxylic acid, phthalic acid, isophthalic acid, terephthalic acid, and benzoic acid. In accordance with the invention, phthalic acid, isophthalic acid, benzoic acid, and especially terephthalic acid, are preferred.

The amount of the carboxylic acid according to (B) ranges from 3 to 20 weight percent, and more particularly from 7 to 15 weight percent, based on the mixture of fatty acids. The amount of the optional carboxylic acid (C) which may be used may range from 1 to 80 weight percent, based on component (B).

Suitable polyalkylene polyamines to be used in accordance with the invention are, in particular, amines which are capable of imidazoline formation. These are of the general formula $$H_2N-(-CH_2-CH_2-NH-)-_mCH_2-CH_2-NH_2$$

wherein m is 1 to 5, for example diethylenetriamine, triethylenetetramine, or tetraethylenepentamine, and optionally may contain amounts of other amines (see Ullmann Enzyklopaedie der technischen Chemie, vol. 14, 1963, p. 74). Also, polyalkylene polyamines not capable of imidazoline formation and of the general formula $$H_2N-(CH_2-CH_2-CH_2-NH)-_mCH_2-CH_2-CH_2-NH_2,$$

wherein m is 1 to 4, for example, dipropylenetriamine or tripropylenetetramine, may be used. Polyalkylene polyamines having ethylene and propylene bridges as alkylene groups, obtained by the cyanoethylation of the amines followed by hydrogenation (for example, $N_3$-amine and $N_4$-amine; see pamphlet of BASF AG, 1976), are also suitable for use.

In accordance with the invention, other amines, too, may be used, such as amines of the general formula $$H_2N-R-NH_2,$$

wherein R is aliphatic hydrocarbon, optionally substituted or interrupted by hetero atoms and in particular by oxygen atoms, having from 2 to 36 carbon atoms and more particularly from 6 to 20 carbon atoms, such as 1,2-diaminoethane, 1,6-diaminohexane, 1,9-diaminononane, 1,12-diaminododecane, dimeric fatty acid amine (prepared by known processes from dimeric fatty acids), the 2,2,4(4,4,2)-trimethylhexamethylenediamines, 1,7-diamino-4-oxa-heptane, 1,12-diamino-4,9-dioxa-dodecane, or 1,20-diamino-4, 17-dioxaeicosane, or cyclic or alicyclic amines, which optionally may contain hetero atoms and in particular nitrogen, such as 1,4-diaminocyclohexane, isophoronediamine, piperazine, dimethylpiperazine, or N-aminoethylpiperazine.

The excess of amine should be such that the polyaminoamides have amine values ranging from 200 to 450, and preferably from 300 to 400.

The reaction is carried out in the usual manner, with all components being reacted simultaneously at a temperature ranging from about 210° to 260° C., optionally under vacuum.

In accordance with the invention, however, a reaction is preferred in which a polyaminoamide is formed in a first step from components (A) and (D) and then is reacted in a second step with component (B), and, optionally, with component (C), under the same conditions.

In an appropriate modification of this process, the components (A) and (D) are reacted in a first step with part of component (B), and optionally of component (C), to give a polyaminoamide, which is then further reacted in a second step with the rest of component (B), and optionally of component (C).

The reaction conditions may be varied conventionally in such a way that the end products have the desired imidazoline content (Y).

The adhesion promoters preferred in accordance with the invention are prepared with the use of a polymerized mixture of fatty acids having a high proportion (X) of trimeric and higher polymeric fatty acids and have an imidazoline content (Y), a requirement being that if the value of either (X) or (Y) is less than 40 percent, the value of the other component is at least 40+Z (Z being the difference between the smaller value and 40), but preferably is at least 40+2Z.

Because of the complex composition of the components, the contents of trimeric and higher polymeric fatty acids (X) and the imidazoline content (Y) are variable particularly with respect to the lower range. While the effects obtainable in accordance with the invention depend primarily on the kind and amount of the carboxylic acid according to (B), they are influenced also by the content of trimeric and higher polymeric acids as well as by their ratio to one another, by the imidazoline content of the polyaminoamide/polyaminoimidazoline mixture, and by the kind and amount of the amine or mixture of amines used.

Polyaminoamides from fatty acids having a content of trimeric and higher polymeric components of 40 percent or higher and an imidazoline content of the condensation product of also 40 percent or higher are preferred. The upper limit for the contents of trimeric and higher polymeric fatty acids is 100 percent, and the upper limit for the imidazoline content of the polyaminoimidazolines is the maximum value actually attainable of the theoretically possible content calculated for the particular mixture.

However, when the value of either X or Y is under 40 percent, the value of the other component should be at least 40+Z (Z being the difference between the smaller value and 40) but preferably at least 40+2Z, in order that a pronounced effect may be achieved.

The range in which both values are low is less preferred but still possible, within narrow limits. Thus, if one value is under 40 percent and the other under 50 percent, the difference between the smaller value and 40 should not be greater than 10.

The advantages offered by the invention are that the plastisol mixtures have practically unlimited storage stability, exhibit no or only minimal color changes after baking, and permit the adhesive strength to be markedly increased, and especially that this increase can be secured through appropriate formulation also with low adhesion promoter concentrations at baking temperatures of 90° C. and up, and preferably of 110° C. and up.

The baking temperature which is optimum for a given polyvinyl chloride formulation (and which depends also on the gelation temperature of the PVC formulation used) can usually be determined simply by trial and error.

Suitable substrates for coating or bonding are all materials commonly used in this field, and particularly metals and glass.

Optionally, the polyaminoamide/polyaminoimidazoline mixtures described above and used in accordance with the invention may be converted to the corresponding Schiff bases and, optionally, enamines by means of commonly used ketones such as acetone, methyl ethyl ketone, diethyl ketone, methyl isobutyl ketone, cyclohexanone, cyclopentanone, diisobutyl ketone, 3,3,5-trimethylcyclohexanone, or methyl phenyl ketone, or aldehydes such as acetaldehyde, butyraldehyde, isobutyraldehyde, or benzaldehyde.

The reaction is carried out by known methods and may be catalyzed with acids and conducted with or without solvents. It is also possible to use the carbonyl compounds themselves in place of a solvent as an entrainer for the water of reaction to be eliminated.

Optionally, adducts of the free amino groups of the above polyaminoamide/polyaminoimidazoline mixtures may be formed with epoxy compounds used in deficiency.

Suitable epoxy compounds are, for example, epoxides derived from polyhydric phenols, and in particular bisphenols such as diphenylolpropane (bisphenol A), diphenylolmethane (bisphenol F), and phenol-formaldehyde condensation products (novolacs), as well as from aromatic di- and polycarboxylic acids, for example, the phthalic acids.

The adducts are obtained by reacting an equivalent of active hydrogen of the amine compound with from 0.5 to 0.005, and more particularly from 0.2 to 0.03, equivalent of epoxide oxygen of the polyepoxide.

Moreover, the polyaminoamide/polyaminoimidazoline mixtures, their epoxy adducts containing amino groups, as well as the Schiff bases and optional enamines which can be prepared from these two product groups, may also be mixed with one another and used as adhesion promoters.

The fatty acids used in the examples have the following composition, as determined by gas-liquid chromatography:

| (1) | Monomeric fatty acid | 9% |
|---|---|---|
|  | Dimeric fatty acid | 75% |
|  | Trimeric and higher-polymeric fatty acids | 16% |
| (2) | Monomeric fatty acid | 1% |
|  | Dimeric fatty acid | 25% |
|  | Trimeric and higher-polymeric fatty acids | 74% |
| (3) | Monomeric fatty acid | 1% |
|  | Dimeric fatty acid | 96% |
|  | Trimeric and higher-polymeric fatty acids | 3% |

PREPARATION OF ADHESION PROMOTERS FOR THE PLASTISOLS OF THE INVENTION

Secondary-condensation examples

In the Examples which follow, the carboxylic acids listed in the Table were added to a polyaminoamide and the mixture was subjected to secondary condensation by being heated under nitrogen 210° C. and held at that temperature for 1 hour. A vacuum of about 100 mm Hg was then applied for 1 hour and secondary condensation was continued for another hour at 210° C. and 100 mm Hg. The conditions of condensation may be varied conventionally depending on the desired imidazoline content. The reaction products obtained were added to the plastisols as a 60% mixture with the plasticizers indicated.

I. The polyaminoamide used was a commercial polyaminoamide (a).

II. In place of polyaminoamide (a), commercial polyaminoamide (b) (amine value, 367; imidazoline content, 60%) was subjected to secondary condensation and used as indicated above.

III. In place of polyaminoamide (a), a polyaminoamide was prepared according to published German patent application DAS 26 54 871 from 800 g of polymeric fatty acid (1), 200 g of polymeric fatty acid (2), and 534 g of triethylenetetramine (amine value, 387; imidazoline content, 78%) and subjected to secondary condensation and used as indicated above.

IV. As in example III, except that 1000 g of fatty acid (3) were used as the polymerized fatty acid.

V. Example for statistical condensation.

A polyaminoamide was prepared by simultaneous condensation of 250 g of polymeric fatty acid (1), 250 g of polymeric fatty acid (2) and 267 g of triethylenetetramine as well as of the tricarboxylic acid listed in the Table, under the conditions earlier indicated.

Polyaminoamides (a) A condensation product comprising a dimerized fatty acid with 5% monomeric fatty acid, 50% dimeric fatty acid, and 45% trimeric and higher-polymeric fatty acid [a 1:1 mixture of fatty acids (1) and (2)] and triethylenetetramine. The polyaminoamide has an amine value of 376 and an imidazoline content of 60%.

(b) A condensation product comprising a dimerized fatty acid with 16% momeric fatty acid, 75% dimeric fatty acid, and 9% trimeric and higher-polymerized fatty acid and triethylenetetramine. The polyaminoamide has an amine value of 390 and an imidazoline content of 60%.

Preparation of plastisols 1 weight percent of the adhesion promoter named, or of any desired mixture thereof, based on the total mixture, is added to a plastisol composed of 45 parts by weight of a polyvinyl chloride with a K value of 70 and adapted to be made into a paste,
55 parts by weight of phthalic acid di-2-ethylhexyl ester,
100 parts by weight of a filler mixture of 50% chalk and 50% barium sulfate, and
1.5 parts by weight of diisobutyltin isooctylthioglycolate ester.

However, the adhesion promoter may also be added to commonly used plastisol formulations other than the one specified above in order to obtain a self-adhesive plastisol in accordance with the invention.

The bond strengths of adhesive bonds obtainable with the plastisols of the invention were determined on the basis of DIN 53 283 by measuring the tensile shear strength.

For this purpose, type 901 bonderized metal sheets of Metallgesellschaft, Frankfurt, were used as parts to be bonded. These were 2.5 cm wide, 10.5 cm long, and 0.15 cm thick.

The thickness of the layer of plastisol forming the adhesive joint was set to 2 mm by means of spacers.

The parts to be bonded were heated at 160° C. for 30 minutes and in the process bonded to overlap one another by 15 mm. The tensile shear strengths listed under "Bond strength" in the Table which follows were obtained.

To check the adhesion to electrochemically coated sheet metal, the plastisol film was applied in a thickness which was increased continuously from 0 to 3 mm and then heated for 30 minutes at 120° C.

A crescent-shaped cut was then made in the cold film, and the adhesion of the film to the substrate was visually evaluated by manual stripping (without the use of implements).

Adhesion very good—film cannot be stripped off
Adhesion good—film can be stripped only partly

TABLE

| Example | Composition | 60% dilution in | Adhesion to electro- chem. coated sheets | Strength to 901 bonderized sheets, kp/cm$^2$ |
|---|---|---|---|---|
| 1 | 500 g I + 18 g BTA | 90% DOP 10% BA | Good | 26.1 |
| 2 | 500 g I + 25 g TMSA | As above | Good | 25.4 |
| 3 | 500 g II + 25 g TMSA | As above | Very good | 28.0 |
| 4 | 500 g III + 25 g TMSA | As above | Very good | 28.5 |
| 5 | 500 g IV + 25 g BTA | As above | Good | 26.8 |
| 6 | 750 g V + 27 g BTA | As above | Good | 24.8 |
| 7 | 450 g I + 14.5 g TMSA + 10.8 g benzoic acid | As above | Very good | 27.3 |
| 8 | 450 g I + 14.5 g TMSA + 10.4 g adipic acid | As above | Very good | 29.7 |
| 9 | 450 g I + 14.5 g DMT + 11.2 g TMSA | As above | Very good | 29.2 |

All adhesion promoters were added in an amount of 1%, based on the plastisol.
DOP = Dioctyl phthalate
BA = Benzyl alcohol
BTA = 1,2,3,4-butanetetracarboxylic acid
TMSA = Trimellitic anhydride
DMT = Dimethyl terephthalate acid

What is claimed is:

1. A plastisol composition for the production of coatings or adhesive bonds comprising a finely divided vinyl chloride polymer, a plasticizer, and from 0.5 to 5 percent by weight of the entire plastisol, of an adhesion promoter which is a condensation product of
   (A) a polymerized fatty acid,
   (B) a polycarboxylic acid having three or more carboxyl groups, or an anhydride or ester thereof, in an amount from 3 to 20 percent by weight of said polymerized fatty acid, and
   (D) an excess, based on the number of carboxyl groups of components (A) and (B), of a polyalkylene polyamine.

2. A plastisol as in claim 1 which additional comprises, as part of the carboxylic acid component,
   (C) an aliphatic, araliphatic, or aromatic dicarboxylic acid or an aromatic monocarboxylic acid.

3. A plastisol as in claim 1 wherein said polymerized fatty acid (A) contains an increased amount of trimeric and higher polymeric fatty acid.

4. A plastisol as in claim 1 wherein said condensation product contains imidazoline groups.

5. A plastisol as in claim 1 wherein said polymeric fatty acid contains a large amount (X) of trimeric and higher polymeric fatty acids and wherein said condensation product contains an amount (Y) of imidazoline groups such that if the value of either (X) or (Y) is under 40 percent, the value of the other component should be at least 40+Z, wherein Z is the difference between the smaller value and 40.

6. A plastisol as in claim 5 wherein, if either (X) or (Y) is under 40 percent, the other value should be at least 40+2Z.

7. A plastisol as in claim 1 wherein said tricarboxylic acid (B) is present in an amount from 7 to 15 percent by weight of said polymerized fatty acid.

8. A plastisol as in claim 2 wherein said carboxylic acid (C) is an aromatic carboxylic acid.

9. A plastisol as in claim 2 wherein said carboxylic acid (C) is present in an amount from 1 to 80 percent by weight of carboxylic acid component (B).

10. A method for making a coating or adhesive bond which comprises applying to a surface to be coated or bonded a plastisol as in claim 1 and then baking the plastisol onto the material at a temperature of at least 90° C.

* * * * *